United States Patent [19]
Schmitt et al.

[11] 3,932,357
[45] Jan. 13, 1976

[54] POLYURETHANE LACQUER COMPOSITION BASED ON ISOPHORONE DIISOCYANATE AND DIAMINE BIS-ALDIME

[75] Inventors: Karl Schmitt, Herne; Josef Disteldorf, Herne am Sengenhoff; Werner Flakus, Recklinghausen, all of Germany

[73] Assignee: Veba-Chemie Aktiengesellschaft, Gelsenkirchen-Buer, Germany

[22] Filed: May 20, 1974

[21] Appl. No.: 471,724

[30] Foreign Application Priority Data
May 22, 1973 Germany............................ 2325824

[52] U.S. Cl.... 260/75 NH; 260/31.2 N; 260/31.8 R; 260/31.8 H; 260/33.6 UB; 260/77.5 AM
[51] Int. Cl.².................C08G 18/30; C08G 18/75; C08G 18/80
[58] Field of Search... 260/75 NK, 75 NH, 77.5 AM

[56] References Cited
UNITED STATES PATENTS

| | | | |
|---|---|---|---|
| 3,420,800 | 1/1969 | Haggis............................ | 260/75 NH |
| 3,752,786 | 8/1973 | Rossitto et al................. | 260/75 NH |
| 3,763,079 | 10/1973 | Fryd.............................. | 260/75 NK |
| 3,803,098 | 4/1974 | Schmitt et al.................. | 260/75 NK |

*Primary Examiner*—H. S. Cockeram
*Attorney, Agent, or Firm*—Burgess, Dinklage & Sprung

[57] ABSTRACT

A polyurethane coating lacquer composition for substrates such as wood, metal, concrete, leather and plastics includes conventional solvents and i. the reaction product of 3-isocyanatomethyl-3,5,5-trimethylcyclohexyl-isocyanate with branched chain polyesters having terminal hydroxyl groups based on mixtures of aliphatic and aromatic dicarboxylic acids, said polyester and said isocyanate being reacted without a catalyst at 10°–35°C. in such quantities that there are two isocyanate groups per —OH group, and 15–85 mol percent of the dicarboxylic acids are aliphatic and the remainder aromatic acids; and ii. an aldime having the formula

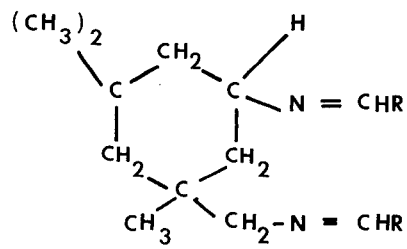

wherein each R is the same or different alkyl having 1 to 8, preferably 1 to 4 carbon atoms.

4 Claims, No Drawings

POLYURETHANE LACQUER COMPOSITION BASED ON ISOPHORONE DIISOCYANATE AND DIAMINE BIS-ALDIME

BACKGROUND

The invention relates to two-component polyurethane lacquer compositions characterized by high reactivity, long shelf life and color-fast coatings.

Polyurethane lacquers with high reactivity at low temperatures and simultaneously long pot life are of great technical interest.

Two-component lacquers on the basis of hydroxyl components and isocyanate adducts are in many cases not sufficiently reactive for various applications in technical production, or else the pot life of strongly activated systems imposes very narrow limits on the field of application.

Two-component lacquers of isocyanate adducts and ketimines, having regard to their reactivity and in some cases also from the standpoint of their pot life, represent an improvement over pure polyurethane systems, but they are capable of only limited use because of their tendency towards yellowing.

Similar inadequacies arise with a large number of aldimes when paired with isocyanate adducts.

SUMMARY

It has now been discovered that it is also possible to obtain polyurethane two-component lacquers containing conventional polyurethane (PUR) solvents, of high activity, without the disadvantages described, for the purpose of coating substrates such as wood, metal, concrete, leather and plastics. The lacquer comprises i. the reaction product of 3-isocyanato-methyl-3,5,5-trimethylcyclohexyl-isocyanate, also known as isophoronediisocyanate or IPDI, with branched chain polyesters having terminal hydroxyl groups based on mixtures of aliphatic and aromatic dicarboxylic acids; and ii. an aldime having the formula

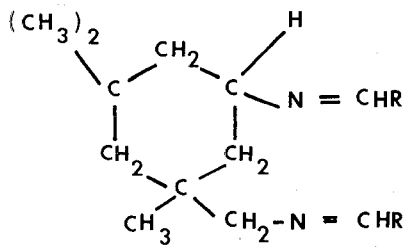

wherein R may be the same or different alkyl radical. The polyester and IPDI are reacted in such quantities that there are two isocyanate groups per OH group, and 15–85, preferably 30–70 mol percent of the dicarboxylic acids are aliphatic and the remainder are aromatic acids, without catalytic additives at 10°–35°C, preferably 15°–25°C.

Isocyanate adducts on the basis of 3-isocyanatomethyl-3,5,5-trimethylcyclohexyl-isocyanate and aldimes of this specific sterically hindered diamine produce, in solution with conventional polyurethane (PUR) solvents, highly reactive lacquer systems which possess extremely long pot lives and form films color-fast to light. The pot lives, depending upon the nature of the solvent, are 20–60 days at room temperature or 10–14 days at 50°C.

DESCRIPTION 3-isocyanatomethyl-3,5,5-trimethylcyclohexylisocyanate, also known as isophoronediisocyanate or IPDI, which is used as the isocyanate component, has proved to be particularly advantageous reaction component from the standpoint of the efficiency demanded by the market of such lacquer systems. The particular suitability of this diisocyanate in conjunction with the branched chain polyesters having terminal hydroxyl groups results from the structural peculiarity of these sterically hindered cyclo aliphatic compound which has the formula

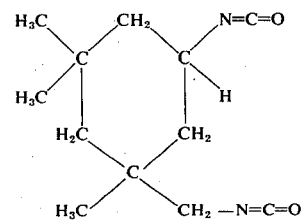

The side chain aliphatic —NCO group displays at room temperature a reactivity approximately 10 times greater than the isocyanate group substituted directly on the ring carbon.

For the reaction with the IPDI, branched chain polyesters having terminal hydroxyl groups on the basis of mixtures of aliphatic and aromatic dicarboxylic acids and polyols are used, wherein the dicarboxylic acid mixture consists as to 15–85 mol percent of aliphatic acid radicals and the remainder are aromatic acids. The branching of the polyesters is obtained by using, in addition to the principal quantity of polyols, which are diols, polyols with more than 2 hydroxyl groups, while the latter should be present at least as to 5 mol percent. Polyesters containing tin are used preferentially.

Suitable aliphatic dicarboxylic acids are particularly aliphatic hydrocarbon diacids having at least 4 carbon atoms, such as succinic acid, glutaric acid, adipic acid, suberic acid, sebacic acid, azelaic acid, etc. The aromatic acid component may be, for example, one of the following dicarboxylic acids: phthalic, isophthalic and terephthalic acid, etc. The said acids may also carry one or more alkyl substiuents having 1 to 6 carbon atoms.

For the manufacture of polyesters comprising hydroxyl groups, aliphatic hydrocarbon diols are suitable which have terminal primary OH groups (free from heteroatoms in the chain), and the central carbon atoms may be alkyl substituted. The term central carbon atoms is understood to mean those which are not carriers of primary OH groups. The diols may also be embraced by the following formula:

$$HO — CH_2 — (CRR)_n — CH_2 — OH,$$

wherein $n \geq 0$ and R equals hydrogen or an alkyl radical, preferably $C_1 - C_4$ alkyl radical, such as ethylene glycol, propylene-glycol (1,3), butane diol (1,4), pentane diol (1,5), hexane diol (1,6) also the singly and multiply alkyl substituted derivatives, 2,2-dimethylpropane diol (1,3) 2,2,4- and 2,4,4-trimethylhexane diol (1,6), etc.

The branching of the polyesters is achieved by partial replacement of the diols by polyols with more than 2 hydroxyl groups. The replacement of the diols or other polyols may be effected in such quantities that 5–50 mol percent of the hydroxyl groups for example originate from such trivalent or polyvalent polyols. Polyols of the following general formula are suitable for obtaining the cross linkage:

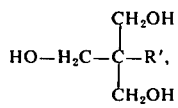

wherein R' may be an alkyl, preferably $C_1$- and $C_2$ - radical, or methylol radical, such as 1,1,1-trimethylolethane, 1,1,1-trimethylolpropane, pentaerythrite, etc.

For the manufacture of polyesters, the dicarboxylic acids may also be used in the form of functional derivatives, i.e., the corresponding esters and the pure and mixed acid anhydrides. Where esters are used, those of short chain alcohols are particularly preferred, i.e., the corresponding methyl, ethyl, n- and i-propyl and n- and i-butyl esters.

For the manufacture of the oxyesters, polyesters, polyols and dicarboxylic acids are used in such quantities that there are 1.2–1.75 hydroxyl groups per carboxylic group.

For the purpose of incorporating tin into the polyesters, tin esters, tin ester oxides, tin alkyl esters, tin halogenides, etc. are suitable, such as Di-n-butyl tin oxide, Di-n-butyl tin dilaurate, tin tetrachloride, tin dichloride, tin di-isooctate, tin diformiate, etc. Tin compounds are used in such quantities that the polyester comprising hydroxyl terminal groups contains tin in quantities of 0.01 up to 0.5 weight percent.

The branched chain polyesters having terminal hydroxyl groups and having tin in the polyester molecule may be manufactured in known and customary manner. The following method, for example is available for this purpose.

Dicarboxylic acids or their anhydrides are used as raw materials. The ratio of equivalents of acids to alcohol is of course governed by the desired molecule size and by the OH number to be obtained. The reaction components are first of all heated without a catalyst in a suitable apparatus with passage of an inert gas, e.g., nitrogen. At approximately 140°C the first water cleavage occurs. The water is removed distillatively from the reaction mixture. Within several hours the reaction temperature is raised to 210°C. When 60–70% of the theoretical water cleavage has occurred, the esterification is continued after adding the tin compound, preferably dibutyl tin oxide. After 10–24 hours the reaction is complete. In this way, on the one hand reproducible oxyesters of high color quality are obtained, and furthermore, the incorporation of the tin catalyst into the oxyester molecule is assured in order to activate the subsequent urethane and urea formation at low temperatures.

For the further reaction, the oxyester is freed largely from water by a brief vacuum treatment down to a water content of 0.02 weight percent. After determining the OH number and water content, the reaction of the oxyesters (polyesters) with IPDI is performed in the solvents listed hereinbelow exactly in the equivalents ratio of —OH to —NCO fractions of 1 : 2 at room temperature and with cooling.

The resulting adducts may either be pigmented with dry customary commercial pigments in a sandmill, or else be used as clear lacquers after dilution appropriate to the application.

As solvents for performing the reaction, all anhydrous solvents are suitable which also must not contain any reactive hydrogen atoms. Furthermore, the suitable solvents must fulfill the condition of being solvents for the end products. If the solutions obtained are applied as lacquers, then the choice of the suitable solvents is limited by the lower and upper boiling points of the customary solvents for lacquers. In addition to pure solvents, solvent mixtures may also be used. All solvents are used in PUR quality. The following, for example, have been found to be particularly useful solvents by their properties, with simultaneously reduced malodor. Compounds from the group xylene, cumene, ethylglycol acetate, n-butylacetate, etc., also mixtures of n-butylacetate with technical xylene mixture and ethylglycol acetate (EGA) in the ratio 6 : 5 : 2 or 6 : 4 : 3.

A further constituent of the polyurethane two-component lacquers are the aldimes of the general formula described hereinbefore, which can be manufactured in known manner by condensation with water cleavage from 3-aminomethyl-3,5,5-trimethylcyclohexylamine, also known as isophoronediamine or IPD, and aliphatic aldehydes, such as acetaldehyde, etc. Among the suitable aliphatic aldehydes, those are particularly preferred which so far as possible carry further alkyl radicals on the α-carbon atom, whilst from among this group, isobutyraldehyde, which is a cheap by-product, has been particularly selected. This aldehyde, after reaction with the described diamine to form N,N'-diisobutylidene-1-amino-3-aminomethyl-3,5,5-trimethylcyclohexane, also produces particularly advantageous technical properties for the two-component lacquers according to the invention. The said special aldimes produce, in conjunction with the described isocyanates of this invention, long pot lives which cannot be obtained with aldimes of other diamines. In order to ensure an extremely long pot life, the aldimes used must be of appropriate purity and must contain no, or very low proportions (less than 0.5 mol percent) of reaction fractions containing amino hydrogen.

It is particularly advantageous if, in the two-component lacquer, the isocyanate adducts and the aldimes are used in such quantity that NCO and aldime equivalents are present in the ratio of 2 : 1.5 – 1.

The lacquer systems can be hardened directly with moisture and also with diamines formed by the water in order to achieve optimum characteristics.

The lacquer systems manufactured according to the invention and described in the examples exhibit at room temperature touch setting times of 10–12 minutes, and lead after short drying periods to non-tacky film surfaces. With termic activation the development of non-tacky surfaces can be shortened depending upon the nature of the substrate and of the layer thickness, but in any case decisively; e.g.:

| Substrate | Temp. | Time | Surface Condition |
|---|---|---|---|
| Wood | 25°C | 60' | Stackable |
|  | 40°C | 10' | Stackable |
|  | 60°C | 5' | Stackable |
| Leather | 75°C | 5' | Non-tacky, stackable after 10' cooling |
| Metal | 80°C | 10' | Non-tacky surface |
| PVC Sheets | 150°C | 4' | Non-tacky surface, stackable after cooling |
| Polyurethane textile coating | 150°C | 3–4' | Non-tacky surface stackable after cooling. |

A further predicate of the lacquers applied according to the invention which would be mentioned is the bubble-free hardening even of very thick lacquer layers, which as is known is a serious problem with pure moisture hardening lacquer systems.

The manufacture of the aldimes is generally known. This method of manufacture will be indicated by the example of the manufacture of diisobutylidene-IPD-aldime.

Manufacture of the aldimes from isobutyraldehyde and IPD 3 mol isobutyraldehyde were dripped at 30°–40°C into a batch of 1 mol IPD whilst stirring. After the reaction two phases formed which were separated from one another. The organic phase was processed by distillation. After driving off the first runnings — substantially isobutyraldehyde and small proportions of intermediate products of the reaction — an aldime fraction was obtained in $K_{P0.2}$ 113°C, which possed the following characteristics:

$n_D^{25}$ : 1,4667
Amine number : 138–139
Yield (% of theory) : 92

The invention will be illustrated by the following examples. (The determination of lacquer properties was performed in accordance with the relevant DIN standards, i.e., pendulum hardness by DIN 53,157, Erichsen indentation by DIN 53,156 and lattice section by DIN 53,151.

EXAMPLE 1 a. Manufacture of the Oxyester 498 g isophthalic acid, 292 g adipic acid, 590 g hexanediol-1,6 and 268 g 1,1,1-trimethylolpropane were esterified. After the cleavage of 5 mol water, 0.2 weight percent of di-n-butyl tin oxide (DBTO) was added and the esterification was continued up to a TAN value (TAN = total acid number) of 0.2.

By applying a vacuum at 200°C for approximately 30 minutes, a product was obtained with a water content of 0.02 weight percent and with a hydroxyl value of 224–227 mg KOH/g, theoretically 229 mg KOH/g.

Formation of the Adduct 1000 g of the oxyester obtained under 1a were dissolved in 618.5 g of anhydrous ethylglycol acetate (EGA)/technical xylene in the weight proportion of 1 : 3 and introduced within 5 hours at 20°C into a batch of 891.5 g IPDI in 400 g EGA/technical xylene in the weight proportion of 1 : 3 with cooling, stirring and exclusion of moisture. The reaction mixture was afterwards stirred for 12 hours and analyzed. The —NCO content was 5.75–5.77%, theoretically 5.79%.

For the testing out of the adduct 1b, the dilution was made with EGA, technical xylene or n-butylacetate (PUR quality) depending upon the proposed application. In the case of pigmentation, the 65 weight percent adduct solution was ground with dried customary commercial inorganic or organic pigments in a mill to the correct pigment volume concentration and diluted according to the proposed application.

Mixing the Lacquer and Lacquer Data 100 g solution of adduct 1b and 7 g diisobutylidene -IPD aldime were intensively mixed.

| Pot life of the mixture : | 20–30 days at 20°C |
|---|---|
| | 7 days at 50°C |

The mixture, after dilution with n-butylacetate to 20 weight percent solid fraction gave the following value:
Touch setting time after drying at 20°C in 8–12 minutes according to ventilation.
Stackability after drying depending upon substrate and ventilation:
at 20°C in 60 minutes
at 40°C in 15 minutes
at 60°C in 10 minutes
at 80°C in 10 minutes
at 150°C in 5 minutes Final Data of Lacquer after Hardening The lacquer, after diluting the solution with the same solvent mixture as before to 55 weight percent resin fraction, was spread at room temperature, using a tensioning frame, onto steel sheets 1mm thick (so-called Erichsen sheets) and left to harden at a relative humidity of 40–60% and at a temperature of 20°C. The following technical lacquer values were attained:

| Pendulum hardness (by Konig) | 153 sec. |
|---|---|
| Erichsen indentation | 11–12 mm |
| Lattice section | 0 |
| Layer thickness | 40µ |

Resistance to Solvents and to Chemicals

After 7 days hardening good
After 14 days hardening Very good
These lacquers may be used for coating metals, timber, concrete, gas concrete, masonry.

EXAMPLE 2 a. Manufacture of the Oxyester

In accoordance with 1a, 5 mol isophthalic acid, 1 mol acipic acid, 6 mol hexanediol 1,6 and 1 mol 1,1,1-trimethylolpropane were esterified. Hydroxyl value 100–103 mg KOH/g. Acid Number: >1.

b. Formation of the Adduct 1000 g of oxyester 2a, 563.4 g EGA/technical xylene, in the weight ratio 1 : 3 to dissolve the oxyester and 417.8 g IPDI in 200 g EGA/technical xylene in the weight ratio of 1 : 3 were reacted in accordance with 1b. NCO number : 3.56–3.58%.

c. Mixing the Lacquer and Lacquer Data 100 g of solution of adduct 2b and 5g diisobutylidene IPD aldime were mixed intensively.

| Pot life of the mixture : | 20–30 days at 20°C |
|---|---|
| | 7 days at 50°C. |

Touch setting time after drying at 20°C in 10–20 minutes according to ventilation.

Final Data of the Lacquer after Hardening

Metal coating on Erichsen sheets in accordance with Example 1c.

| Pendulum hardness (by Konig) | 80 sec. |
| --- | --- |
| Erichsen indentation | 11–12mm |
| Lattice section | 0 |
| Layer thickness | 30–40μ |

Resistance to Solvents and to Chemicals

After 7 days hardening good
After 14 days hardening Very good
Can be used for coating PVC, PVC-synthetic leather, timber, metal.

EXAMPLE 3 a. Manufacture of the Oxyester

In accordance with Example 1a, 3 mol phthalic acid, 2 mol adipic acid, 5 mol hexane diol 1,6 and 2 mol 1,1,1-trimethylolpropane were esterfied. Hydroxyl value 224–227 mg KOH/g. Acid number: >1.

b. Formation of Adduct 1000 g oxyester 3a, 621.1g EGA/technical xylene in the weight ratio of 1 : 3 to dissolve the oxyester and 898.9 g IPDI in 400 g EGA/technical xylene in the weight ratio of 1 : 3 were reacted as indicated for adduct formation 1b. NCO number 5.76–5.78% c. Mixing the Lacquer and Lacquer Data 100 g solution of adduct 3a and 7 g diisobutylidene IPD aldime were mixed intensively.

| Pot life of mixture : | 20–30 days at 20°C |
| --- | --- |
|  | 7 days at 50°C |

Touch setting time after drying at 20°C in 10–20 minutes according to ventilation.

Final Data for the Lacquer after Hardening

Metal coating on Erichsen sheets in accordance with Example 1c.

| Pendulum hardness (by Konig) | 165 sec. |
| --- | --- |
| Erichsen indentation | 11–12 mm. |
| Lattice section | 0 |
| Layer thickness | 30–40μ |

Resistance to Solvents and to Chemicals

After 7 days good
After 14 days Very good
Used for coating of metals, timber, concrete, gas concrete, masonry.

EXAMPLE 4 a. Manufacture of the Oxyester

In accordance with Example 1a, 3 mol phthalic acid, 3 mol adipic acid, 6 mol hexanediol 1,6 and 1 mol 1,1,1-trimethylolpropane were esterfied. Hydroxyl value 104–106 mg KOH/g. Acid number: 1.

b. Manufacture of the Adduct 1000 g of oxyester 4a, 573.8 g EGA/technical xylene in the weight ratio of 1 : 3 to dissolve the oxyester and 437.2 g of IPDI in 200 g EGA/technical xylene in the weight ratio of 1 : 3 were reacted as in the case of adduct formation 1b. NCO number 3.68–370%.

c. Mixing the Lacquer and Lacquer Data 100 g of solution of adduct 4b and 5 g diisobutylidene IPD aldime were mexed intensively.

| Pot life of mixture : | 20–30 days at 20°C |
| --- | --- |
|  | 7 days at 50°C |

Touch setting time after drying at 20°C in 10–20 minutes according to ventilation.

Final Data for Lacquer after Hardening

Metal coating on Erichsen sheets in accordance with Example 1c.

| Pendulum hardness (by Konig) | 32 sec. |
| --- | --- |
| Erichsen indentation | 11–12 mm. |
| Lattice section | 0 |
| Layer thickness | 30–40μ |

Resistance to Solvents and Chemicals

After 7 days hardening good
After 14 days hardening Very good.
Use for coating leather and PVC.

What is claimed is:

1. Polyurethane coating composition comprising
   i. the reaction product of 3-isocyanatomethyl-3,5,5-trimethylcyclohexyl-isocyanate with branched chain polyesters having terminal hydroxyl groups based on mixtures of aliphatic and aromatic dicarboxylic acids, said polyester and said isocyanate being reacted without a catalyst at 10°–35°C. in such quantities that there are two isocyanate groups per —OH group, and 15–85 mol percent of the dicarboxylic acids are aliphatic and the remainder aromatic acids; and
   ii. an aldime having the formula

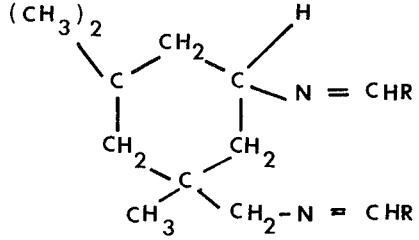

wherein each R is the same or different alkyl having 1 to 8, preferably 1 to 4 carbon atoms.

2. Polyurethane composition of claim 1 wherein said polyester contains tin.

3. Polyurethane composition of claim 1 wherein the aldime N,N′diisobutylidene-1-amino-3-aminomethyl-3,5,5-trimethylcyclohexane.

4. Polyurethane composition of claim 1 wherein isocyanate reaction product and aldimes are used in such quantities that —NCO and aldime equivalents are present in the ratio of 2 : 1.5 – 1.

* * * * *